United States Patent
Asano et al.

[11] Patent Number: 6,084,496
[45] Date of Patent: Jul. 4, 2000

[54] MAGNETIZING METHOD FOR A PERMANENT-MAGNET MOTOR

[75] Inventors: Yoshinori Asano, Takefu; Masayuki Shinto, Sabae; Hiroshi Itoh, Takefu, all of Japan

[73] Assignee: Matsushita Electric Industrial Co., Ltd., Kadoma, Japan

[21] Appl. No.: 09/104,221

[22] Filed: Jun. 25, 1998

[30] Foreign Application Priority Data

Jun. 27, 1997 [JP] Japan ................................. 9-171398

[51] Int. Cl.⁷ .............................. H01F 7/02; H01F 13/00
[52] U.S. Cl. .............................................................. 335/284
[58] Field of Search ........................... 335/284, 296–306; 310/49 R, 152–156; 324/207.25

[56] References Cited

U.S. PATENT DOCUMENTS

| | | | |
|---|---|---|---|
| 5,424,902 | 6/1995 | Shida et al. ................................ | 335/284 |
| 5,624,503 | 4/1997 | Yamashita ................................. | 148/103 |
| 5,684,352 | 11/1997 | Mita et al. ................................ | 310/156 |

FOREIGN PATENT DOCUMENTS 0 746 079   12/1996   European Pat. Off. .

*Primary Examiner*—Lincoln Donovan
*Assistant Examiner*—Raymond Barrera
*Attorney, Agent, or Firm*—Wenderoth, Lind & Ponack, L.L.P.

[57] ABSTRACT

In a method of magnetizing a material of a permanent magnet portion provided in a rotor for a permanent-magnet motor, the material of the permanent magnet portion is embedded inside the rotor body, while the permanent magnet material has anisotropy in a direction penetrating the permanent magnet portion in section, and then the rotor is incorporated in a magnetizing unit and held in a rotatable manner, and the permanent magnet material is magnetized by flowing a magnetizing current through windings under the condition that the rotor is rotatably held in the magnetizing unit. Thus, the permanent magnet material is completely magnetized in a normalized direction, and even if the rotor is shifted from the normalized position, the rotor is retained back to the normalized position by a magnetic torque.

7 Claims, 11 Drawing Sheets

MAGNETIZING METHOD FOR A PERMANENT-MAGNET MOTOR

BACKGROUND OF THE INVENTION

1. Field of the Invention

The present invention generally relates to a magnetizing method for a permanent-magnet motor, and in particular to a method of magnetizing a permanent-magnet material used in a rotor structure of a permanent-magnet motor having reversed salient-polarity to make effective use of a reluctance torque together with a magnetic torque.

2. Description of the Prior Art

Conventionally, permanent-magnet motors are used as examples of variable velocity motors in many cases. A permanent-magnet motor has a rotor which includes plural pieces of permanent-magnet. In such a permanent-magnet type motor, a permanent magnet is formed by, e.g., molding a solidmass of magnetic powder material. Therefore, the molded permanent magnet material has no magnetic polarity at an initial stage of manufacturing process of a motor. Namely, by effecting a magnetizing process of a permanent magnet material, the magnetic polarity is given to the permanent magnet material for the first time to form plural pieces of permanent magnet members.

When a magnetizing operation of a permanent magnet material is carried out, a center axis of the resultant permanent magnet member must be positioned in a normalized relationship in accordance with an axis of a magneto-motive force generated by a magnetizing current flowing through windings located on a stator so that the magnetic pole is fixed to a reference or normalized position without any displacement. This alignment of the magnet axis and the magneto-motive force axis was conventionally performed by a mechanical construction.

If magnetization of the permanent magnet material is carried out with a displacement between the magnet axis and the magneto-motive force axis, the resultant magnetization is insufficient in quantity, resulting in a reduction of a driving efficiency of a motor and causing an error in detecting a rotational position of a rotor. Thus, the alignment of the magnet axis and the magneto-motive force axis is essentially necessary.

In a conventional magnetizing method for a rotor having an outward salient polarity as shown in FIG. 13, electric current for alignment is applied from an alignment current source to flow through windings on a stator to generate a magneto-motive force. In the meanwhile, the rotor core 103 includes four pieces of permanent magnet 106 for four polarized sections and joint members 108 of electromagnetic steel for coupling the adjoining permanent magnet members to each other. In this construction, when the alignment current is flown through the windings, the magneto-motive force generated by the alignment current acts as an absorbing force for absorbing the joint members. Thus, the rotor is rotated toward the normalized position for establishing the alignment by the absorbing action due to the magneto-motive force generated by the alignment current. By this alignment operation, the magnet center axis is set to a specified relationship of e.g. right angles with respect to the axis of the magneto-motive force generated by the alignment current.

Then, under the condition that the rotor is set in the normalized position, the magnetization is carried out by applying a magnetizing current from a magnetizing current source to flow through the windings. In this magnetizing operation, the magnet center axis can be coincident with the axis of the magneto-motive force generated by flowing the magnetizing current through the windings so that the rotor is maintained in the normalized position.

In order to effectively take advantage of a magnet torque as well as a reluctance torque, another conventional method of magnetizing a permanent magnet material was developed for fabricating a rotor having a reversed (i.e., inward) salient polarity as shown in FIGS. 9 and 10. In this construction, the material of the permanent magnet is firstly embedded in a rotor body of a motor and then magnetized. It is noted here that the reluctance torque is a component of the total torque when the motor is operating synchronously. It results from the saliency of the poles and is a manifestation of the poles attempting to align themselves with the air-gap magnetic field.

FIGS. 9 and 10 show an example of a conventional magnetizing method for a permanent-magnet type motor to have a reversed salient-polarity construction effectively taking advantage of a reluctance torque along with a magnetic torque. In this construction, plural permanent magnet material portions 52a and 52b are embedded for each pole section inside a rotor core 51 of a rotor 50. The rotor core 51 is essentially composed of high permeable materials such as, e.g., iron or formed by laminating electromagnetic steel plates. Then, the embedded permanent magnet materials 52a and 52b are magnetized by applying a magnetizing current from a magnetizing current source (not shown) flowing through windings 21 provided on a stator 20.

The rotor 50 is rotated on a rotating shaft 54, generating a magnetic torque and reluctance torque due to a rotational magnetic field generated by the current flowing through the windings 21 on the stator 20. Thus, the magnetization of the permanent magnet materials 52a and 52b embedded in the rotor 50 is carried out by flowing electric current between, e.g., R-phase and S-phase of the three phases through the windings 21 while the rotor 50 is fixed to a normalized position specified for accurate and complete magnetization as shown in FIGS. 9 and 10.

In this magnetizing operation, however, if the position of the rotor is even only slightly displaced from the normalized position, the reluctance torque acts as a rotating force to rotate the rotor 50, which undesirably causes a shift in position of the rotor to result in insufficient magnetization.

In order to avoid this problem, the rotor 50 is incorporated in a motor 1 as shown in FIG. 11, with its shaft end 53 being securely regulated in position by providing a securing jig member 55 for preventing the rotor from rotating.

Alternatively, as shown in FIG. 12, the rotor 50 is incorporated in a cylindrical magnetizing yoke 4 with the shaft end 53 fixed in position to a securing jig member 56 for preventing rotation of the rotor.

However, in the mechanical alignment of the magnet axis and the magneto-motive force axis in these conventional magnetizing methods mentioned above, as the magnetizing current is required to have a large value of several tens or several hundreds times larger than the rated current value, therefore the rotational force of the rotor 50 by the reluctance torque is very strong. Accordingly, there has been a problem that the securing jig member for preventing rotation of the rotor is undesirably damaged, or a mechanism for transferring a driving force from the rotating shaft is damaged in some cases.

SUMMARY OF THE INVENTION

The present invention has been developed with a view to substantially solving the above described disadvantages.

Accordingly, an essential objective of the present invention is therefore to provide a novel magnetizing method for a permanent-magnet motor.

In order to achieve the above objective, according to an aspect of the present invention, a method of magnetizing a material of a permanent magnet portion provided in a rotor having a magnetic pole for a permanent-magnet motor, comprises:

embedding the material of the permanent magnet portion inside the rotor body, where the permanent magnet material has anisotropy in a direction penetrating the permanent magnet portion in section;

incorporating the rotor in a magnetizing unit to be held in a rotatable manner; and magnetizing the permanent magnet material embedded in the rotor under the condition that the rotor is rotatably held in the magnetizing unit.

By this method of the arrangement, the anisotropy is given to the permanent magnet material to have magnetic properties which differ in various directions for the rotor of the permanent-magnet motor, and a shaft core of the rotor is rotatably positioned on the rotation center axis, so that permanent magnet material is magnetized in a normalized direction, and even if the rotor position is shifted from the normalized position during the magnetizing operation, the rotor position is retained back to the normalized position by a magnetic torque, thus completely magnetizing the permanent magnet material.

In an aspect of the present invention, the direction in the middle part of the anisotropy on each permanent magnet portion is substantially parallel to the magnetic pole center line of the rotor, and each permanent magnet portion has an inward convex arc shaped plate in sectional view having radial anisotropy in each magnetic pole of the rotor to fabricate a reversed salient-pole construction to thereby effectively take advantage of a magnetic torque together with a reluctance torque.

By this method, a reluctance torque is effectively used and the permanent magnet material can be completely magnetized with ease even for a high efficient motor.

According to another aspect of the present invention, the magnetizing unit comprises a stator of a motor and at least one end of a rotating shaft of the rotor is rotatably held by a bearing means provided in the stator during the magnetizing operation.

By this method of the arrangement, the magnetization can be performed in the incorporated condition of the rotor before the motor is loaded, and therefore there is no need for providing a securing jig member for preventing rotation of the rotor, thus improving productivity of a motor.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
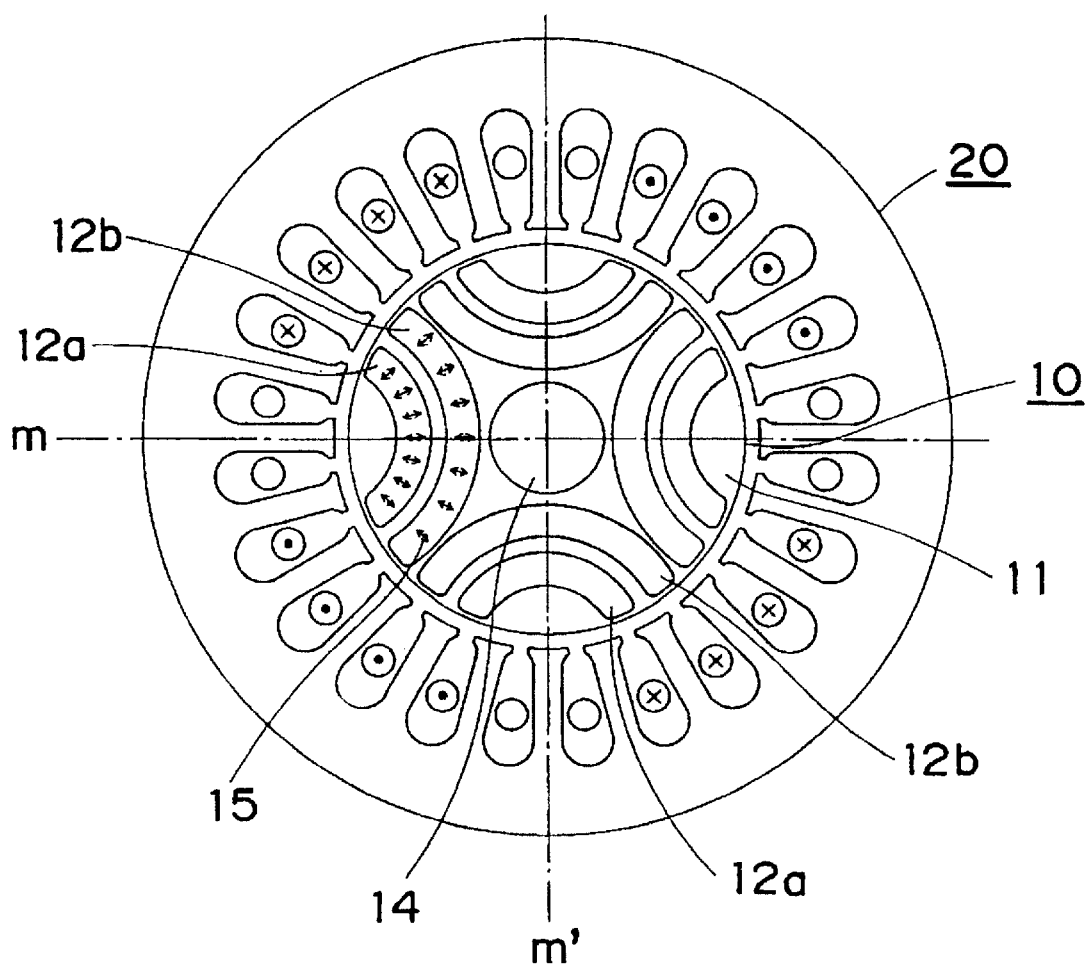
FIG. 1 is a sectional view of a motor with a rotor set to a normalized position according to an embodiment of the present invention.

Before the description proceeds, it is noted that, since the basic structure of the preferred embodiment is similar to that of the conventional one, like parts are designated by the same reference numerals throughout the accompanying drawings.

The following describes a preferred embodiment of a magnetizing method for a permanent-magnet motor with reference to FIGS. 1 to 8.

In a method of magnetizing a permanent magnet material for a permanent-magnet motor, as shown in FIG. 1, permanent magnet materials 12a and 12b are embedded around a rotating shaft 14 inside a rotor core body 11 to form one or more permanent magnet portions symmetrically for, e.g., four pole sections in section view. In this embodiment, e.g., two pieces of permanent magnet material portions 12a and 12b are radially arranged in each pole section. As the permanent magnet materials, although almost any kind of steel capable of being hardened by heat treatment may be used, it is preferable to use iron-powder compact materials especially produced for this purpose, or other materials, for example, hardened alloys, ceramic, and the like work-hardened materials.

The rotor core body 11 is essentially formed of high permeable materials such as, e.g., iron or formed by laminating a plurality of electromagnetic steel plates, and the permanent magnet materials 12a and 12b embedded in the rotor core body 11 are magnetized to fabricate a rotor 10 having a reversed salient-polarity to make effective use of a reluctance torque together with a magnetic torque. In this arrangement, by applying a magnetizing current from a magnetizing current supply source, the rotor 10 is rotated with the rotating shaft 14 while a magnetic torque and reluctance torque are generated due to a rotational magnetic field generated by the windings 21 provided on a stator 20 of the motor. Thus, the windings 21 provide, e.g., four pole sections having a three-phase construction.

In a preferred embodiment, although two or more pieces of the embedded permanent magnet portions 12a and 12b are arranged in a radial direction in the rotor core body for each pole section, one permanent magnet material portion may be formed in each pole section. Each permanent magnet material portion has an inward convex arc shaped plate in sectional view to have a reversed salient-polarity.

In this construction, an anisotropic material is used as the permanent magnet material portions to have anisotropy in radial directions as shown by arrow mark 15 which are oriented in directions penetrating the permanent magnet portions in section where the center line of the anisotropy marks 15 on each permanent magnet portion is substantially parallel to the magnetic pole center line m (m') of the rotor and the concentrated radial center of the anisotropy mark 15 is coincident with the radial center of the arc shaped permanent magnet portions in each pole section. Thus, a rotor is fabricated to have a reversed salient-pole construction in which the magnetic polarization properties differ in different directions. Ferrite or rare-earth materials may be used as an anisotropic material for the permanent magnet so long as the material has an anisotropy property when performing a magnetization operation.

Figure 2:
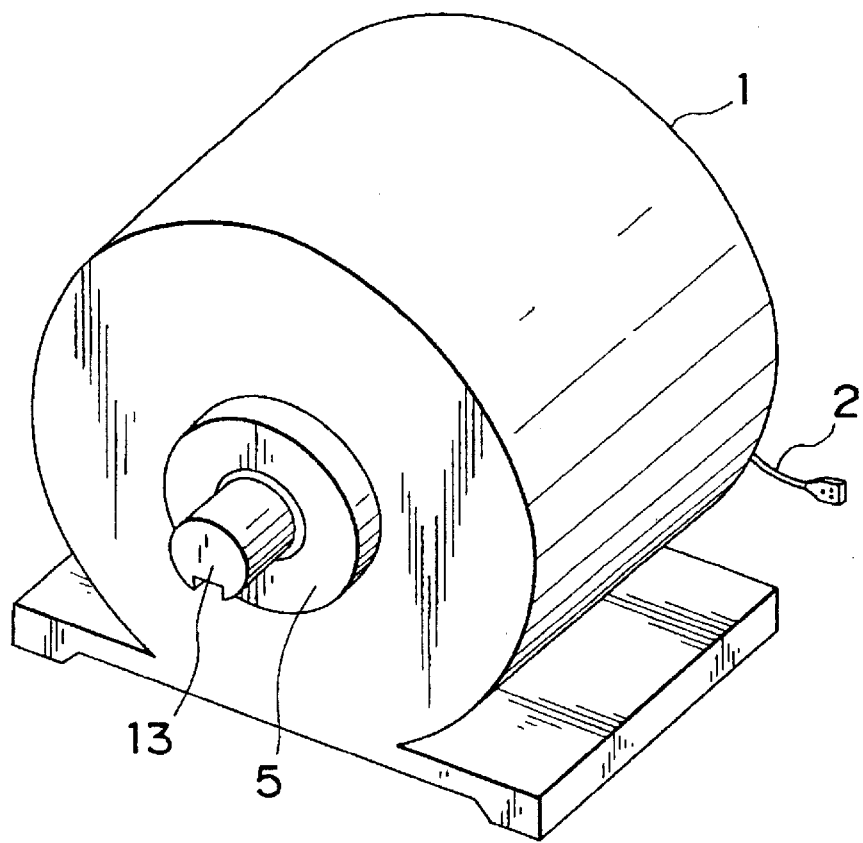
FIG. 2 is a schematic view of a motor incorporated with a rotor according to an embodiment of the present invention.

The magnetization of the permanent magnet materials 12a and 12b embedded in the rotor core 11 is carried out by flowing a magnetizing electric current between two phases, e.g., R-phase and S-phase of the three phases through the windings 21 provided on the stator 20 under the condition that the rotor 10 is incorporated in a motor shown in FIG. 2.

In this magnetizing operation shown in FIG. 2, there is not provided any securing jig member for preventing rotation of the rotor but the rotating shaft 14 of the rotor 10 is freely rotatable by providing a bearing means 5 in the condition that the center axis of the shaft is fitted to the rotation axis of the rotor whereas the shaft end 13 is not fixed nor loaded but made freely rotatable.

Figure 3:
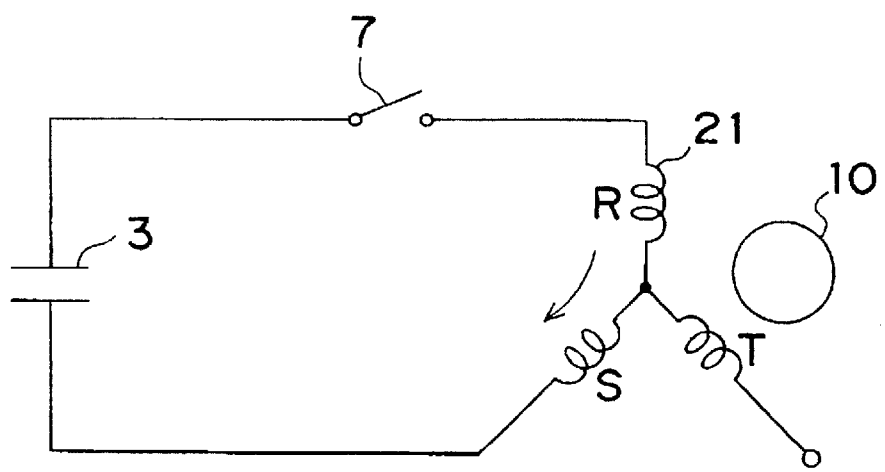
FIG. 3 is a circuit diagram showing a magnetizing current supply construction according to an embodiment of the present invention.
Figure 4:
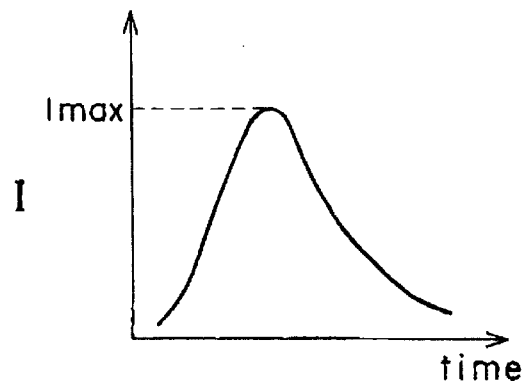
FIG. 4 is a graph showing a waveform of a magnetizing current according to an embodiment of the present invention.

In this embodiment, as shown in FIG. 3, the magnetizing electric current is flown, e.g., from the R-phase to the S-phase by connecting a terminal 2 to a magnetizing power source (not shown) in a magnetizing circuit. In a usual arrangement, electric charge is held by a capacitor 3, and when a switch 7 is closed on, the electric current is instantaneously flown through the windings 21, where the magnetizing current instantaneously increases to a peak value Imax and attenuates as shown by a current waveform in FIG. 4.

In this arrangement, according to a general theory in a rotor structure having a reversed salient-polarity, a force (F) acting as a shifting force to shift the rotor in rotational position from the normalized position is equal to a sum of a magnetic torque (TM) and a reluctance torque (TR), that is represented by:

$$F = TM + TR$$

where the magnetic torque (TM) and reluctance torque (TR) are represented as following equations:

$$TM = -c_1 I\psi \sin 2\theta$$

$$TR = c_2 I^2 \psi \sin 4\theta$$

where $c_1$ and $c_2$ are positive constants, I is electric current, $\psi$ is magnetic flux, and $\theta$ is a shifted (mechanical) angle of a rotor from the normalized position.

Figure 5:
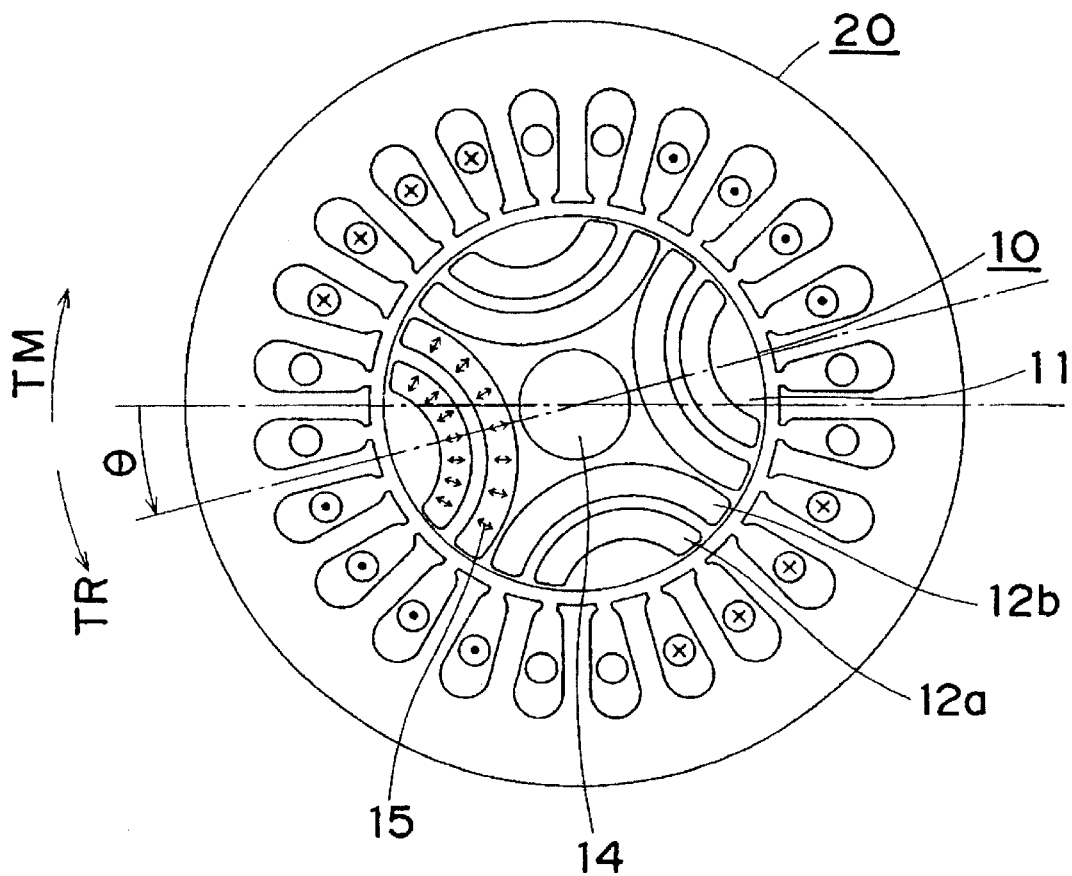
FIG. 5 is a sectional view of a motor with a rotor shifted from a normalized position according to an embodiment of the present invention.

In this connection, when $\theta = 0$, namely, when the rotor is precisely located in the normalized position, no magnetic torque nor reluctance torque is generated and then the rotor is in a stationary condition (i.e., F=0). However, as shown in FIG. 5, when the rotor is slightly shifted in position from the normalized position by a minute angle $\theta$ (>0), the reluctance torque becomes positive (TR>0) but the magnetic torque remains TM=0 because the magnetization amount is zero (i.e., $\psi$=0) at the initial stage before the magnetization is effected. Therefore, the shifting force becomes positive (F>0), acting as a rotating force to further shift the rotor in position. In the meanwhile, since the permanent magnet materials 12a and 12b have anisotropy 15, the magnetization proceeds although incompletely and the magnetic flux is gradually increased to be positive ($\psi$>0). When the magnetization further proceeds and absolute value of TM becomes larger than the value of TR, the force F=TM+TR becomes negative (i.e., F<0), and thus the rotor is restored back toward the normalized position (i.e., point of $\theta$=0) in an attenuation manner as the rotor is freely rotatable. Once the rotor position is settled to the normalized position, the magnetization of the permanent magnet materials is precisely effected at the normalized position of the rotor since then, ensuring the complete and accurate magnetization.

Figure 6:
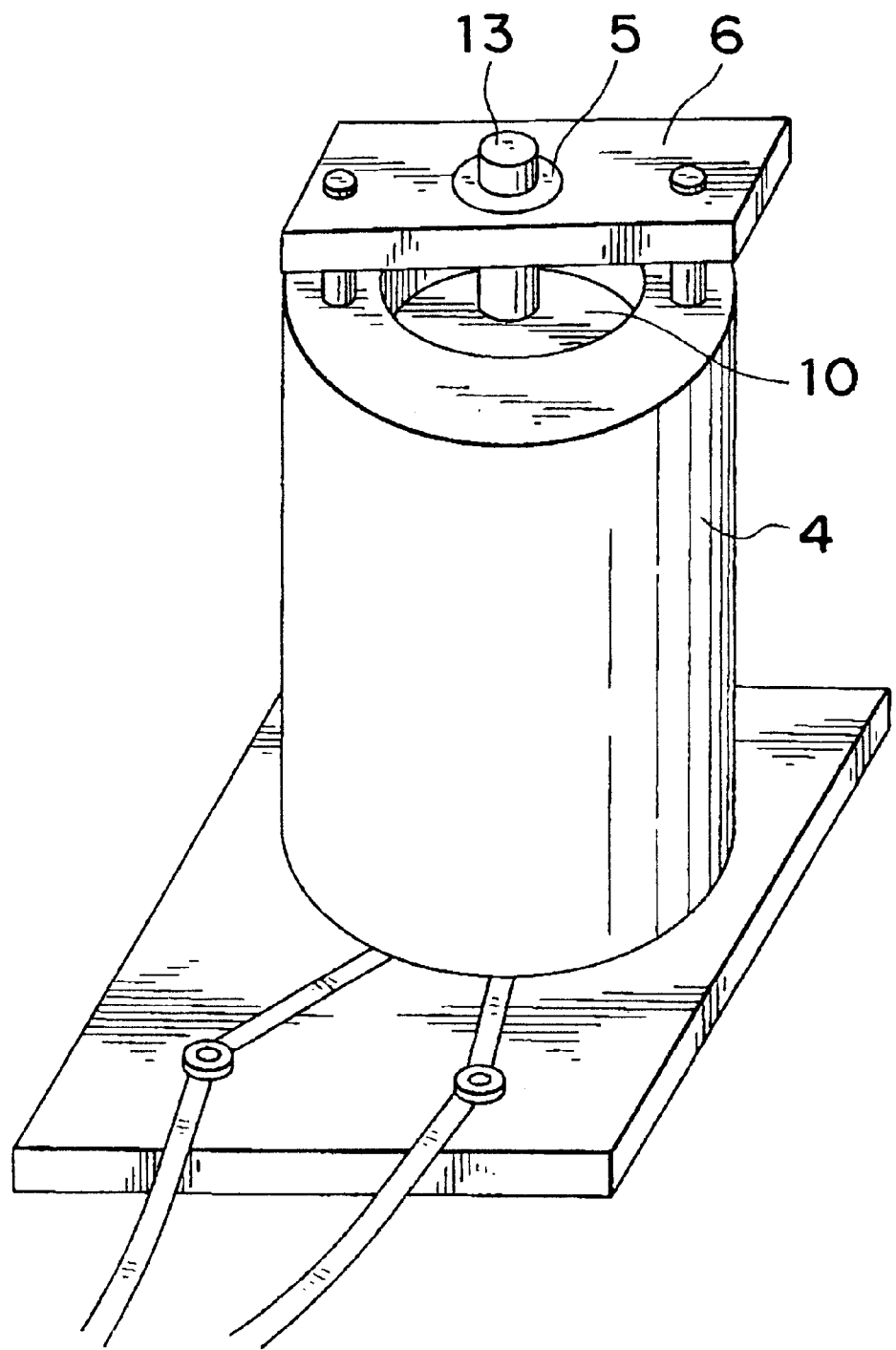
FIG. 6 is a schematic view of a magnetizing yoke incorporated with a rotor according to an embodiment of the present invention.

In a modified embodiment, as shown in FIG. 6, the rotor 10 is incorporated in the magnetizing yoke 4 instead of a motor and the shaft core of the rotor is fitted to the rotation axis in the condition that the rotor is freely rotatable by providing a bearing means 5 in a jig member 6 in the vicinity of at least one end portion 13. In this construction, the magnetizing current is flown through windings (not shown) provided on the yoke 4.

Figure 7:
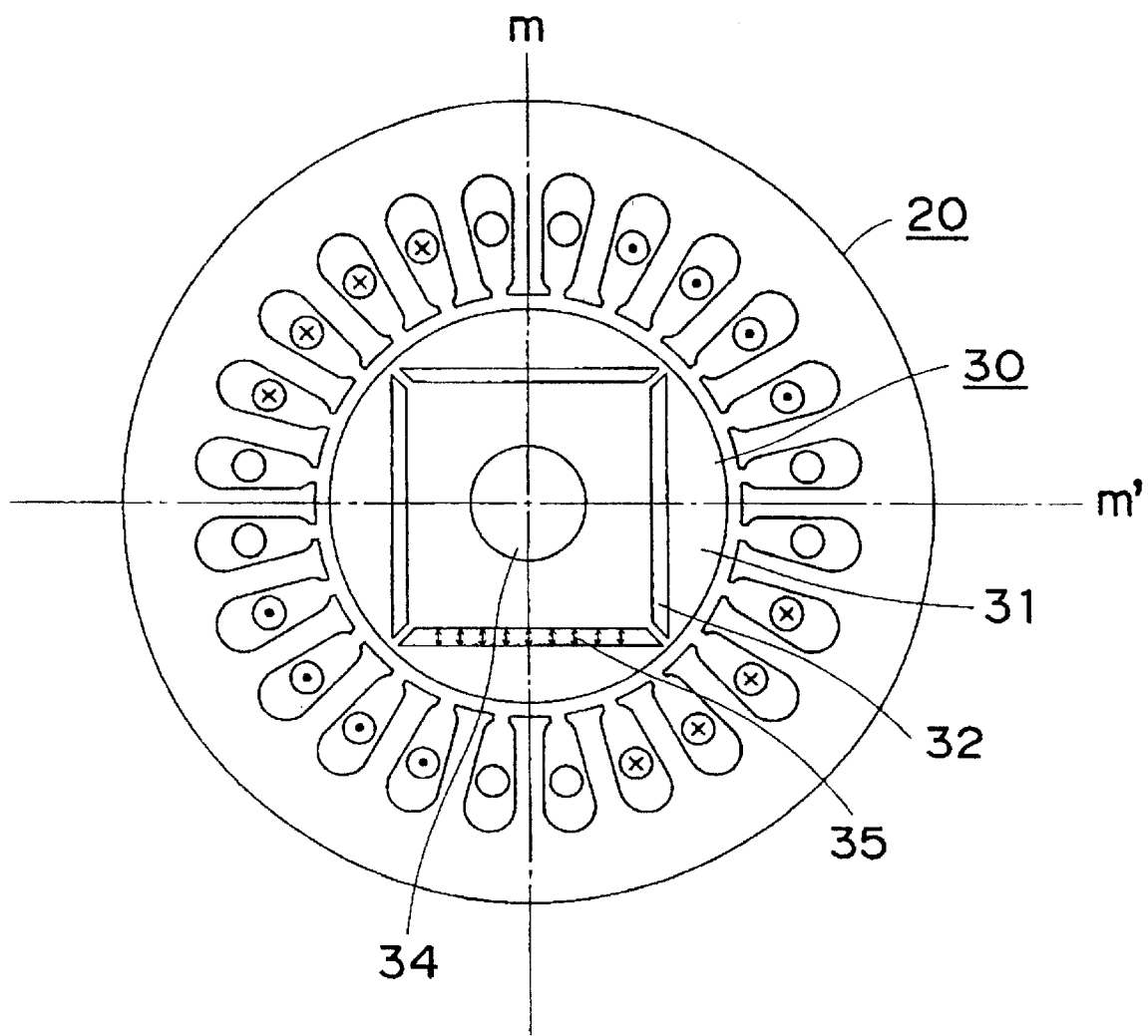
FIG. 7 is a sectional view of a motor according to another embodiment of the present invention.

In another modified embodiment as shown in FIG. 7, e.g., four flat plates of the permanent magnet material 32 are embedded in a rotor core body 31 to form a square shape in section view so that each permanent magnet plate has anisotropy represented by arrow marks 35 oriented in a direction penetrating the permanent magnet plate in section and substantially parallel to the center line m (m') of the magnetic pole of the rotor 30.

In this arrangement, since the permanent magnet portion 32 is formed of a flat plate, the manufacturing process can be precisely performed at a low cost with high accuracy, thereby providing a high reliable motor, suppressing irregularity in size thereof. Moreover, when the permanent magnet portion is made of rare-earth materials having anisotropy, a large amount of magnetic flux can be generated with a less amount of magnet, which allows a motor to be small in size.

Figure 8:
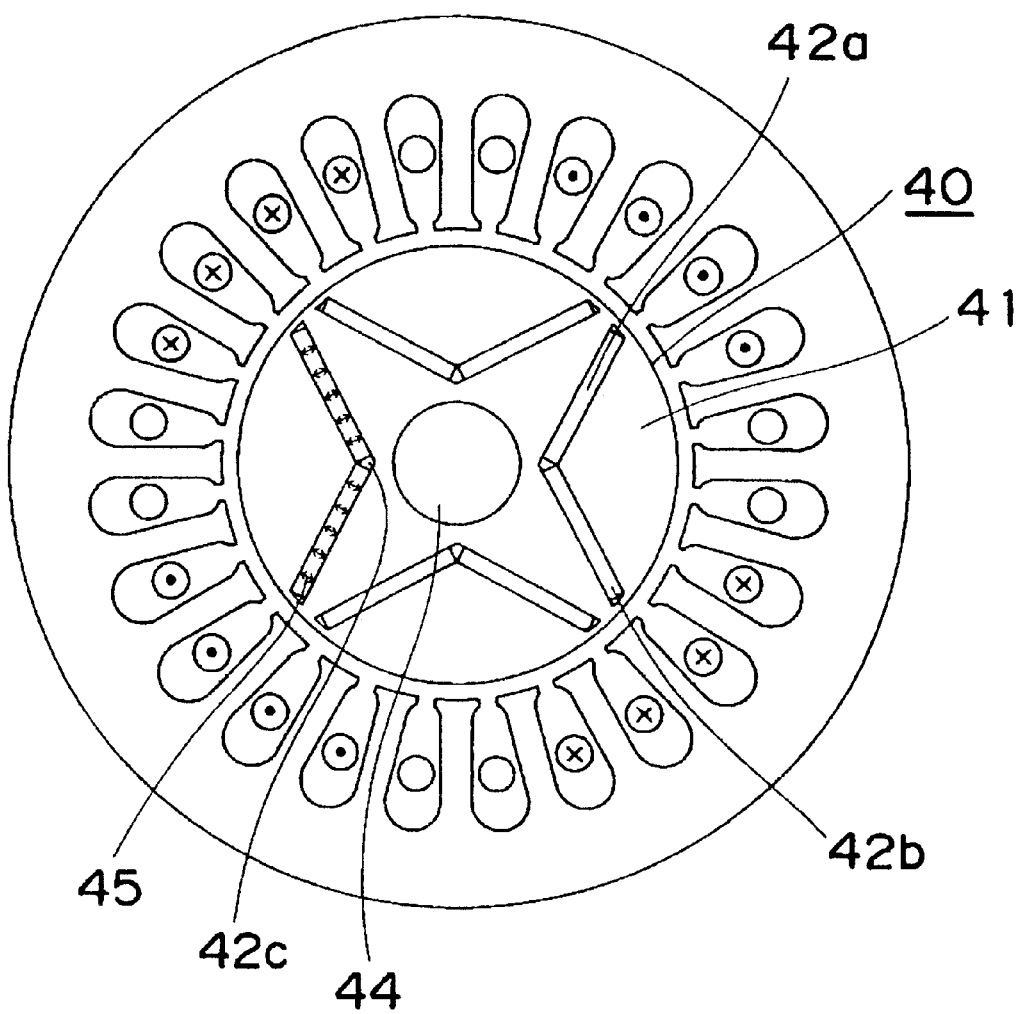
FIG. 8 is a sectional view of a motor according to another further embodiment of the present invention.
Figure 9:
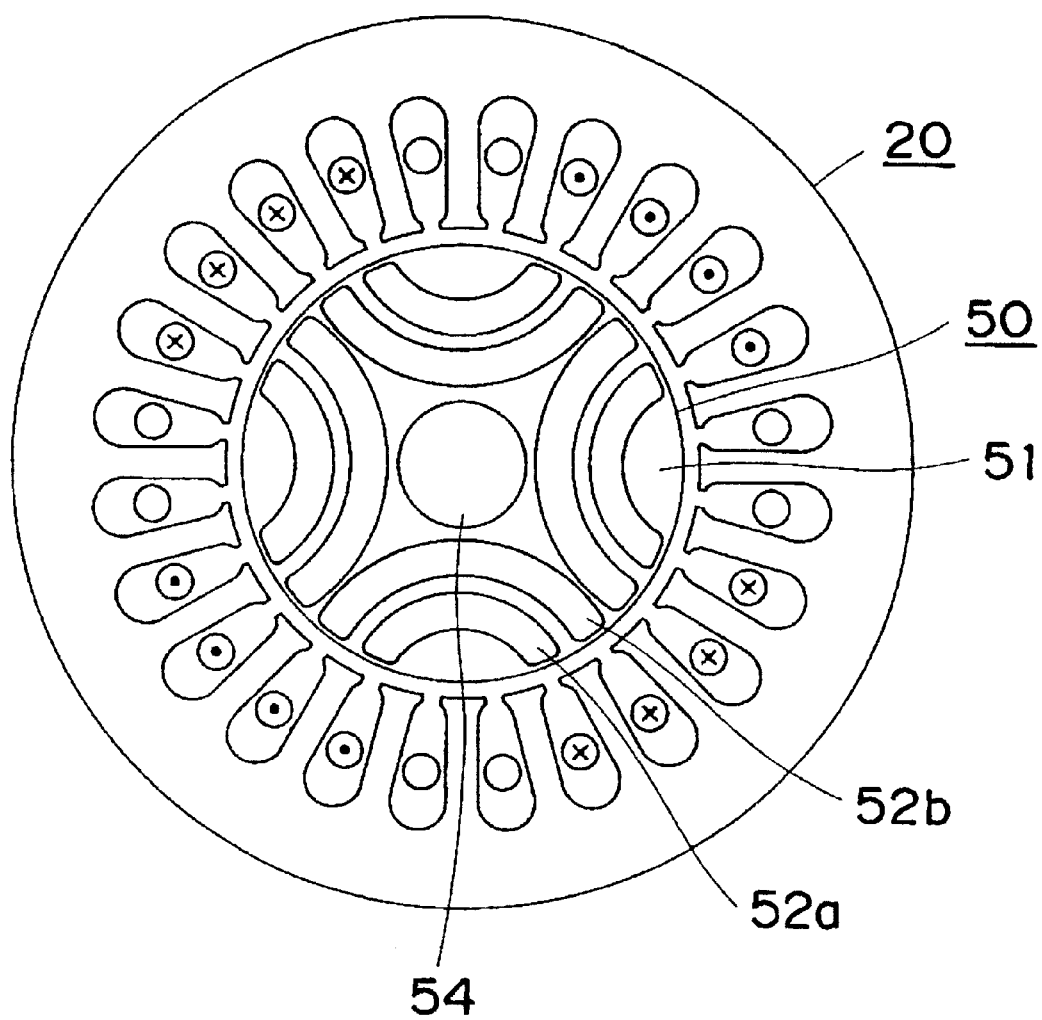
FIG. 9 is a sectional view of a motor showing a conventional magnetizing method.
Figure 10:
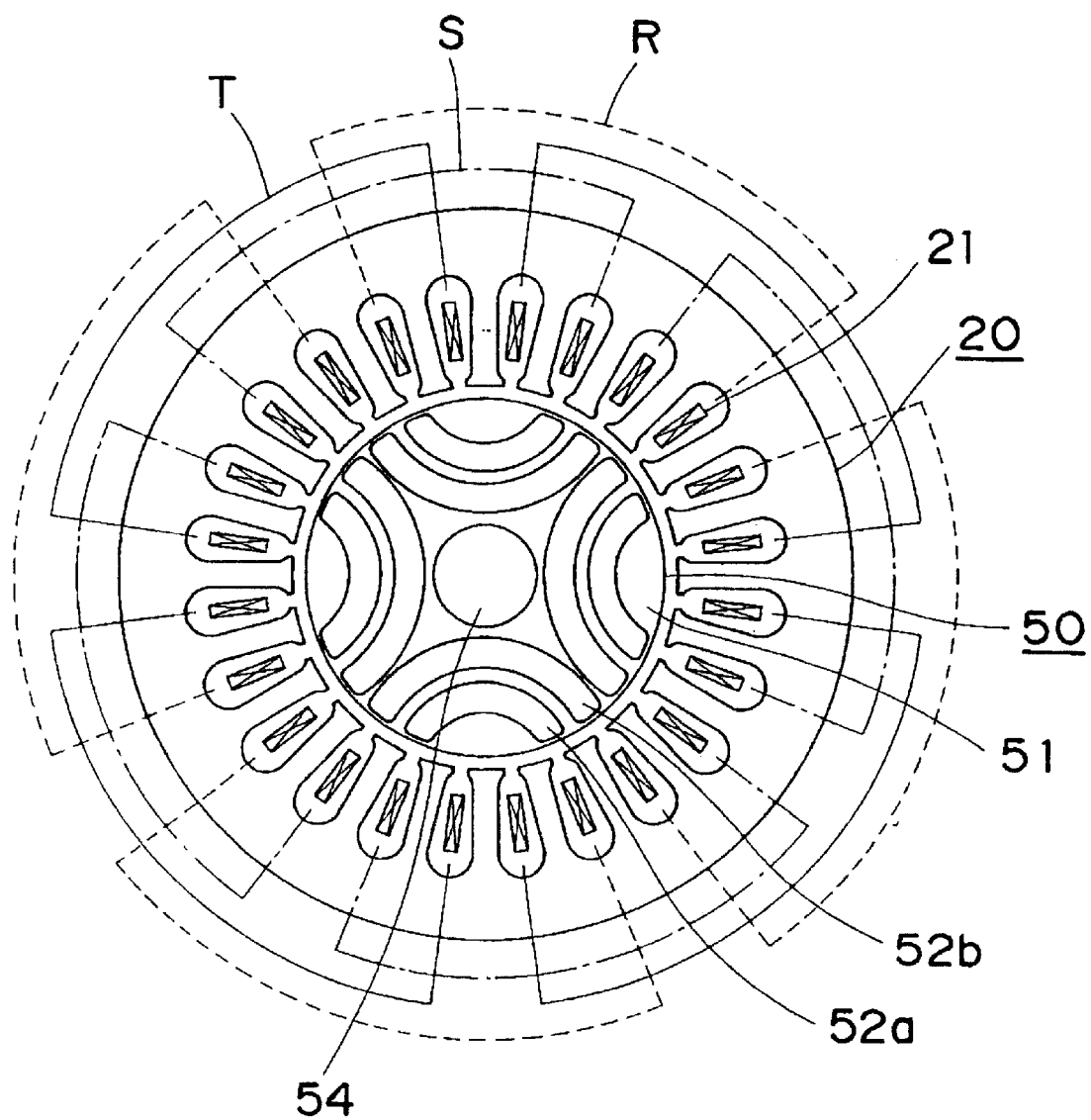
FIG. 10 is a sectional view of a motor showing a conventional construction of windings.
Figure 11:
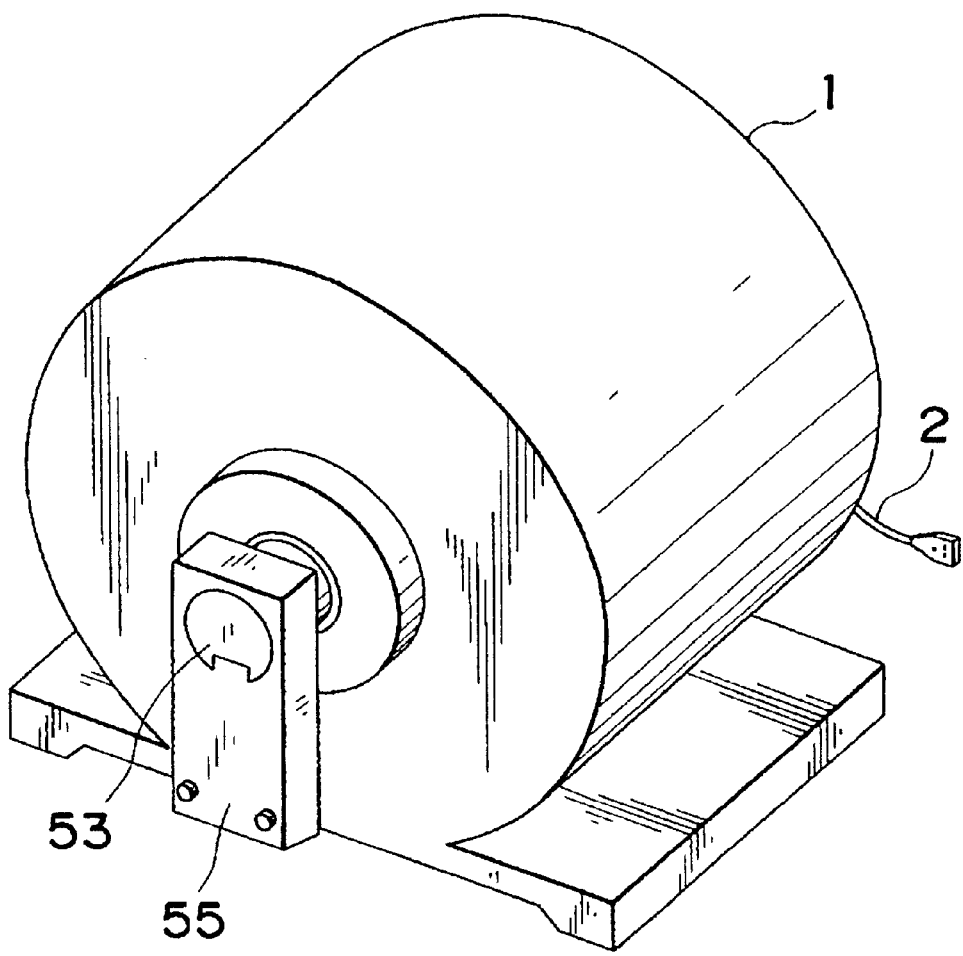
FIG. 11 is a schematic view of a motor incorporated with a rotor showing a conventional magnetizing method.
Figure 12:
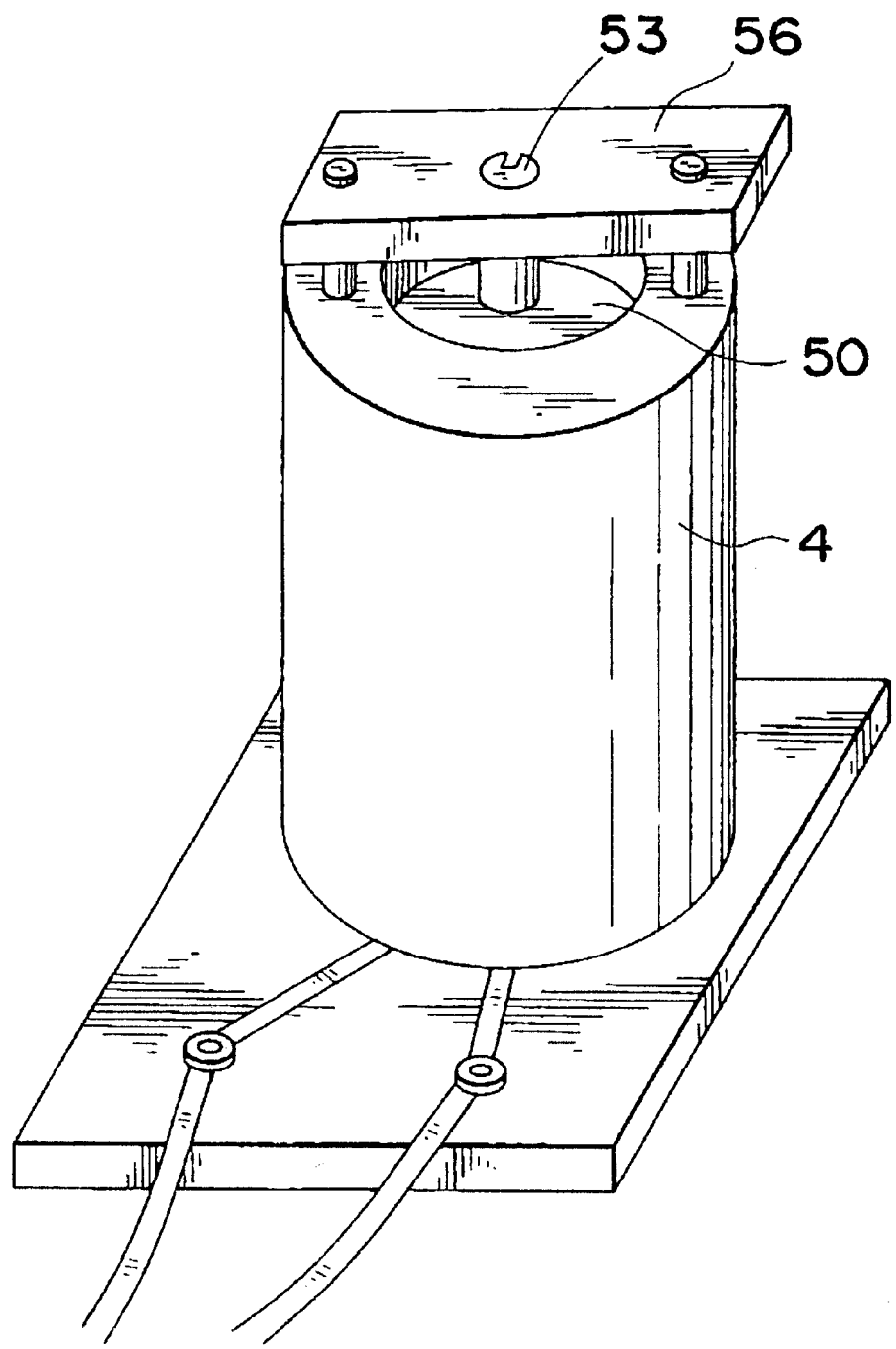
FIG. 12 is a schematic view of a magnetizing yoke incorporated with a rotor showing a conventional magnetizing method.
Figure 13:
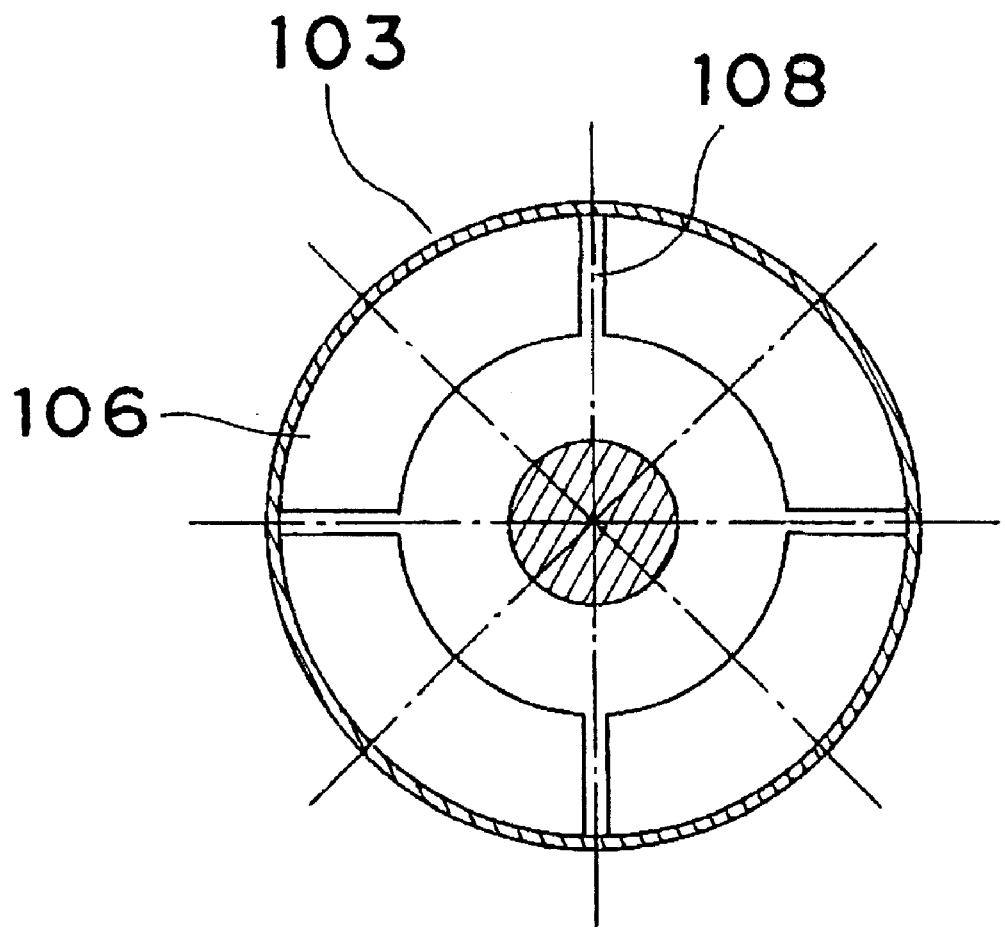
FIG. 13 is a sectional view of a conventional salient-pole type motor.

In another further modified embodiment as shown in FIG. 8, a pair of permanent magnet material portions 42a and 42b are embedded for one pole section in a rotor core body 41. Each pair of permanent magnet portions 42a and 42b are coupled to each other to form a generally V-character shape plate having a vertex or tip end 42c thereof projected inward in section view at which the two permanent magnet portions 42a and 42b are joined. In this construction, each permanent magnet portion is provided with anisotropy represented by arrow marks 45 generally oriented in a direction penetrating the permanent magnet plate in section so that the magnetic fluxes are concentrated to the center of each magnetic pole of the rotor.

In these embodiments described above, although the magnetizing current is flown between the R-phase and S-phase of the windings in a magnetizing operation, the current may be flown between any other two phases, for example, between T phase and a short-circuited point of the R and S phases, so long as the rotor position is generally fitted to the normalized position.

Moreover, the present invention is not limited to the above described embodiments, and a driving way of a motor, arrangement of the windings and a type of a motor may be changed to various modifications within the scope of the present claimed invention.

As apparent from the above description, according to a first aspect of the present invention, even when a reluctance torque acts on the rotor to cause a shift in position during a magnetizing operation, the rotor position is restored back toward the normalized position by a magnetic torque because of the anisotropy of the permanent magnet material so that the magnetization is completely carried out with high accuracy.

According to a second aspect of the present invention, the magnetization can be carried out in a state of a rotor incorporated with a permanent magnet material before a motor is provided with a load. Thus, the magnetization can be carried out without providing any securing jig member for preventing rotation of a rotor, which improves productivity of a motor.

According to a third aspect of the present invention, a reluctance torque is effectively used and the permanent magnet material can be completely magnetized with ease even for a high efficient motor.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method of magnetizing a material of permanent magnet portions provided in a rotor having a magnetic pole for a permanent-magnet motor having a reversed salient polarity to make effective use of a reluctance torque together with a magnetic torque, said method comprising:

embedding the material of the permanent magnet portions inside the rotor, the permanent magnet portions having anisotropy in a direction penetrating the permanent magnet portions in section;

incorporating the rotor in a magnetizing unit to be held in a rotatable manner; and magnetizing the permanent magnet portions embedded in the rotor under a condition such that the rotor is held in the magnetizing unit in a rotatable manner;

wherein each permanent magnet portion is magnetized by applying only a magnetizing electric current when the rotor is held in a rotatable manner in the magnetizing unit without applying another positioning current.

2. A method as claimed in claim 1, wherein the direction in a middle part of the anisotropy on each permanent magnet portion is substantially parallel to the magnetic pole center line of the rotor.

3. A method as claimed in claim 1, wherein each permanent magnet portion has an inward convex arc shaped plate in sectional view having radial anisotropy of which a concentrated center is coincident with a center of the arc shaped permanent magnet portion in each magnetic pole of the rotor to fabricate a reversed salient-pole construction.

4. A method as claimed in claim 1, wherein a plurality of the permanent magnet portions are radially arranged in section for each magnetic pole of the rotor where a total number of the permanent magnet portions is equal to an integer times a total number of the magnetic poles.

5. A method as claimed in claim 1, wherein the magnetizing unit comprises a stator of a motor and at least one end of a rotating shaft of the rotor is held in a rotatable manner by a bearing means in the stator during said magnetizing.

6. A method as claimed in claim 1, wherein said magnetization of the permanent magnet portions embedded in the rotor is carried out by flowing electric current between two phases among three phases through windings provided on the magnetizing unit.

7. A method as claimed in claim 1, wherein each permanent magnet portion has anisotropy in a direction substantially parallel to a transverse direction in section of the permanent magnet portions so that the magnetic fluxes thereof are concentrated onto the center of each magnetic pole.

* * * * *

UNITED STATES PATENT AND TRADEMARK OFFICE
CERTIFICATE OF CORRECTION

PATENT NO. : 6,084,496
DATED : July 4, 2000
INVENTOR(S) : Yoshinari ASANO et al.

It is certified that error appears in the above-identified patent and that said Letters Patent is hereby corrected as shown below:

On the cover page, item [75] Inventors: change "Yoshinori Asano" to --Yoshinari Asano--.

Signed and Sealed this

Twenty-ninth Day of May, 2001

NICHOLAS P. GODICI

*Attest:*

*Attesting Officer*     *Acting Director of the United States Patent and Trademark Office*